(12) United States Patent
Theurer et al.

(10) Patent No.: US 9,304,566 B2
(45) Date of Patent: Apr. 5, 2016

(54) SYSTEMS AND METHODS FOR USE IN COMMUNICATING WITH A CHARGING STATION

(75) Inventors: Charles Burton Theurer, Alplaus, NY (US); Bernhard Joseph Scholz, Niskayuna, NY (US); Brandon Stephen Good, Niskayuna, NY (US); Benjamin Edward Beckmann, Niskayuna, NY (US); Li Zhang, Niskayuna, NY (US); Patrick Anthony Montelo, Schaumburg, IL (US)

(73) Assignee: General Electric Company, Schenectady, NY (US)

( * ) Notice: Subject to any disclaimer, the term of this patent is extended or adjusted under 35 U.S.C. 154(b) by 1081 days.

(21) Appl. No.: 13/285,506

(22) Filed: Oct. 31, 2011

(65) Prior Publication Data
US 2013/0110632 A1    May 2, 2013

(51) Int. Cl.
H04J 7/00 (2006.01)
B60K 6/20 (2007.10)
G06F 1/26 (2006.01)
G06F 3/0481 (2013.01)

(52) U.S. Cl.
CPC .............. *G06F 1/266* (2013.01); *G06F 3/0481* (2013.01)

(58) Field of Classification Search
CPC ..................................................... Y02T 90/14
USPC ........................................................ 320/109
See application file for complete search history.

(56) References Cited

U.S. PATENT DOCUMENTS

| 5,563,491 | A | 10/1996 | Tseng |
| 6,614,204 | B2 | 9/2003 | Pellegrino et al. |
| 7,350,608 | B2 | 4/2008 | Fernandez |
| 7,352,141 | B2 | 4/2008 | Kling et al. |
| 7,999,506 | B1 * | 8/2011 | Hollar et al. .................. 320/104 |
| 8,509,988 | B2 * | 8/2013 | Uyeki et al. ................. 701/33.4 |

(Continued)

FOREIGN PATENT DOCUMENTS

| CN | 102144249 A | 8/2011 |
| JP | 2007195144 A | 8/2007 |

(Continued)

OTHER PUBLICATIONS

Perez, Marin, "My Ford smartphone app gives electric vehicles remote access," Jan. 6, 2011, retrieved from website http://www.intomobile.com/2011/01/06/myford-app-smartphone-ces/ (7 pgs).

(Continued)

*Primary Examiner* — Edward Tso
*Assistant Examiner* — Ahmed Omar
(74) *Attorney, Agent, or Firm* — General Electric Company

(57) ABSTRACT

Portable communication devices and methods for use in charging an electrically powered vehicle are disclosed. One example portable communication device includes a first input device configured to scan an optical machine-readable code associated with the charging station, a display device, and a processor coupled to the first input and display devices and configured to determine an identification number of a charging station based on an optical machine-readable code scanned by the first input device, to initiate communication with the charging station through at least one network, and to cause the display device to display a user interface, the user interface including content associated with the charging station.

20 Claims, 8 Drawing Sheets

(56) References Cited

U.S. PATENT DOCUMENTS

| | | | | |
|---|---|---|---|---|
| 8,577,528 | B2* | 11/2013 | Uyeki | 701/22 |
| 8,983,775 | B2 | 3/2015 | Hu et al. | |
| 2003/0229678 | A1* | 12/2003 | Wen et al. | 709/217 |
| 2006/0129336 | A1 | 6/2006 | Pretlove et al. | |
| 2009/0174365 | A1 | 7/2009 | Lowenthal et al. | |
| 2009/0177595 | A1 | 7/2009 | Dunlap et al. | |
| 2010/0013434 | A1 | 1/2010 | Taylor-Haw et al. | |
| 2010/0090865 | A1 | 4/2010 | Dasgupta | |
| 2010/0153313 | A1 | 6/2010 | Baldwin et al. | |
| 2010/0153771 | A1 | 6/2010 | Gordon et al. | |
| 2010/0198428 | A1 | 8/2010 | Sultan et al. | |
| 2010/0211643 | A1* | 8/2010 | Lowenthal et al. | 709/206 |
| 2010/0274570 | A1 | 10/2010 | Proefke et al. | |
| 2011/0153140 | A1 | 6/2011 | Datta et al. | |
| 2011/0153474 | A1 | 6/2011 | Tormey et al. | |
| 2011/0191220 | A1 | 8/2011 | Kidston et al. | |
| 2012/0309455 | A1* | 12/2012 | Klose et al. | 455/557 |
| 2013/0041850 | A1* | 2/2013 | LaFrance | 705/412 |
| 2013/0127417 | A1* | 5/2013 | Karner et al. | 320/109 |
| 2014/0159660 | A1* | 6/2014 | Klose et al. | 320/109 |
| 2014/0266046 | A1* | 9/2014 | Baxter et al. | 320/109 |

FOREIGN PATENT DOCUMENTS

| | | |
|---|---|---|
| WO | 2008076914 A1 | 6/2008 |
| WO | 2011049887 A1 | 4/2011 |
| WO | 2011109460 A2 | 9/2011 |

OTHER PUBLICATIONS

Seif, Abby, "Control Anything With Your Cell Phone," Popular Science, Jan. 10, 2009, retrieved from website http://www.popsci.com/gear-amp-gadgets/article/2009-01/control-anything-your-cell-phone (3 pgs).

Wong, Sy, "Control4 EC-100—An Intelligent Energy Management Home Control System in Digital Home", Sep. 14, 2009, retrieved from website My Digital Life at http://www.mydigitallife.info/control-4-ec-100-an-intellingent-energy-management-home-control-system-in-digital-home/ (4 pgs).

"Welcome to the World of BlueKey™ Wireless Systems," retrieved from website http://www.bluekeywireless.com/ (1 page).

Wilson, Mark, "Crestron Home Automation Systems Are Now iPad Compatible," Feb. 19, 2010, retrieved from website http://gizmodo.com/5475869/crestron-home-automation-systems-are-now-ipad-compatible (3 pgs).

Anthony, Sebastian, "TeleTouch: Turn your smartphone into a truly universal remote control," Oct. 5, 2011, retrieved from website http://www.extremetech.com/computing/98601-teletouch-turn-your-smartphone-into-a-truly-universal-remote-control (2 pgs).

Drawbaugh, Ben, "Control your entire house with your iPhone or iPod Touch," Dec. 20, 2007, retrieved from website http://mobile.engadget.com/2007/12/20/control-your-entire-house-with-your-iphone-or-ipad-touch/ (4 pgs).

ChargePoint by Coulomb Technologies, Inc., product description on iTunes Preview, retrieved from website http://itunes.apple.com/us/app/chargepoint/id356866743 (2 pgs).

"Malaysia's Electric Vehicle Drive," The AutoIndustrie Blog, Dec. 20, 2010, retrieved from website http://www.theautoindustrieblog.com/2010/12/malaysias-ev-drive-push.html (16 pgs).

Venkatraman, Vijaysree, "App could help you control your home appliances," Oct. 5, 2011, New Scientist, retrieved from website http://www.newscientist.com/article/mg21128324.800-app-could-help-you-control-your-home-appliances.html (2 pgs).

Unofficial English Translation of Chinese Office Action and Search Report issued in connection with corresponding CN Application No. 201210426174.5 dated Sep. 30, 2015.

EP Search Report and Written Opinion from corresponding EP Application No. 12189945.4 dated Jan. 13, 2016.

AU Examination Report issued in connection with corresponding Application No. 2012241138 on Aug. 19, 2015.

Rlanctot, "Delphi Emerges at SAE with Answer to Nokia Terminal Mode", Automotive Multimedia and Communication, Apr. 16, 2010.

* cited by examiner

SYSTEMS AND METHODS FOR USE IN COMMUNICATING WITH A CHARGING STATION

BACKGROUND OF THE INVENTION

The subject matter disclosed herein relates generally to charging systems and methods and, more particularly, to portable communication devices for use in interacting and communicating with a charging station.

Electrically powered vehicles, including electric vehicles and plug-in hybrid electric vehicles, include electric motors powered by energy storage devices, such as batteries. Because an energy storage device is depleted of energy as the vehicle is operated, the operator of the vehicle must recharge the energy storage device prior to using the vehicle again.

At least some known vehicle charging stations are provided for public and/or private use. Such charging stations are designed to charge the energy storage device when connected to the vehicle. Charging stations are dispersed at various locations and often require entering information prior to charging the vehicle and displaying information while the vehicle is being charged. Information may include, for example, payment information necessary to pay for energy transferred from the charging station to the vehicle, or power drawn by the vehicle. As such, known charging stations generally require physical interaction between a user and the charging station to enter charging and/or payment information.

BRIEF DESCRIPTION OF THE INVENTION

In one aspect, a portable communication device for use in communicating with a charging station is provided. The portable communication device includes a first input device configured to scan an optical machine-readable code associated with the charging station, a display device, and a processor coupled to the first input and display devices and configured to determine an identification number of a charging station based on an optical machine-readable code scanned by the first input device, to initiate communication with the charging station through at least one network, and to cause the display device to display a user interface, the user interface including content associated with the charging station In another aspect, a method for use in charging an electrically powered vehicle is provided. The method includes scanning an optical machine-readable code associated with a charging station, determining an identification number associated with the charging station based on the scanned optical machine-readable code, transmitting the identification number to a charging network server, and displaying a user interface including at least one of a control for the charging station and content associated with the charging station.

In yet another aspect, one or more non-transitory computer-readable storage media having computer-executable instructions embodiments thereon are provided. When executed by at least one processor, the computer-executable instructions cause the processor to determine an identification number associated with a charging station based on a scanned optical machine-readable code, retrieve information associated with the charging station based on the determined identification number, and cause a user interface associated with the charging station to be displayed. The user interface includes at least one of a control for the charging station and content associated with the charging station.

In another aspect, a portable communication device for use in communicating with a charging station is provided. The portable communication device includes an input device configured to receive at least one input identifying a charging station, a display device, and a processor coupled to the input and display devices and configured to identify a charging station in response to the at least one input to the input device, to initiate communication with the identified charging station, and to display, at the display device, a user interface including advertising content associated with the charging station

DETAILED DESCRIPTION OF THE INVENTION

Figure 1:
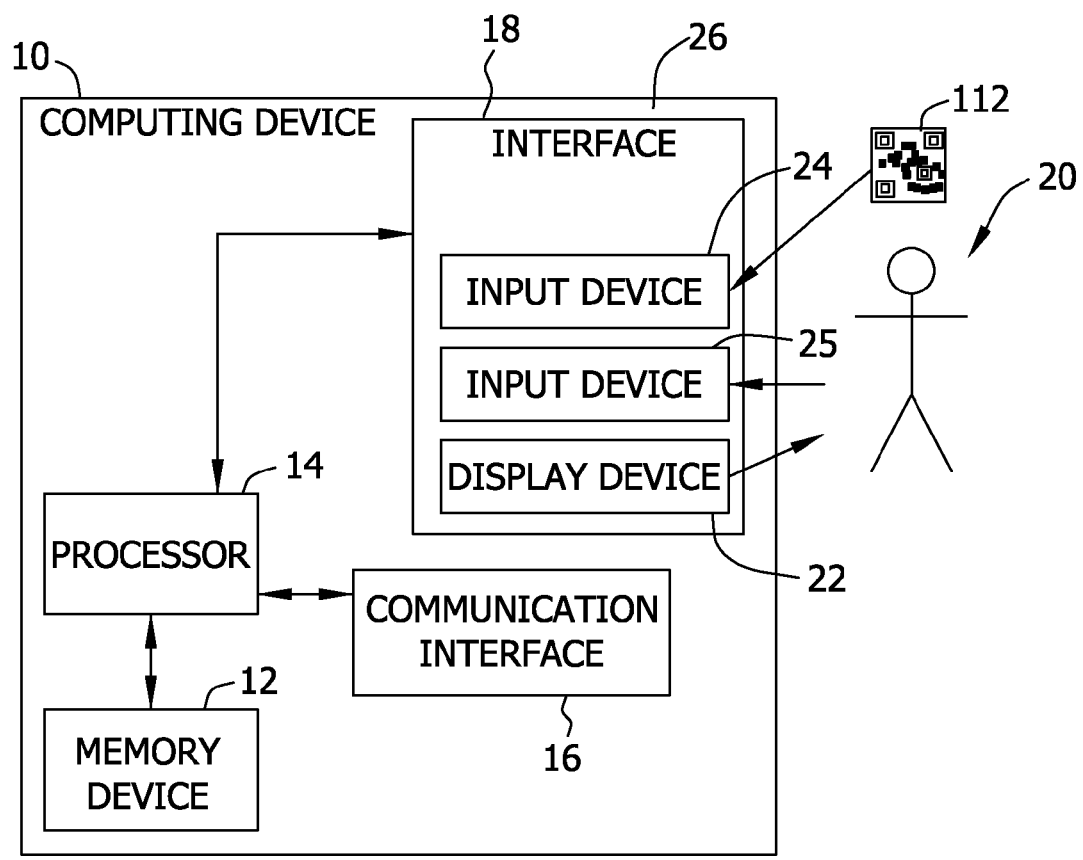
FIG. 1 is a block diagram of an exemplary computing device.

The embodiments described herein relate to utilizing a portable communication device to communicate with a charging station to charge an electrically powered vehicle. In some embodiments, portable communication devices are configured to scan an optical machine-readable code associated with the charging station and to command power transfer from the charging station. Additionally, or alternatively, in some embodiments, portable communication devices are configured to display one or more user interfaces including a control for the charging station and/or advertising content associated the charging station.

In numerous embodiments, the term "electrically powered vehicle" is used to refer to a vehicle that includes one or more electric motors that are used for propulsion. Energy used to propel electrically powered vehicles may come from various energy storage devices, such as, but not limited to, an on-board rechargeable battery, a capacitor, and/or an on-board fuel cell. In one embodiment, the electrically powered vehicle is a hybrid electric vehicle, which may include both an electric motor and a combustion engine. In another embodiment, an electrically powered vehicle is an electric vehicle, which may include only an electric motor for propulsion. Electrically powered vehicles may capture and store energy generated, for example, by braking. Moreover, some electrically powered vehicles are capable of recharging the energy storage device from a power receptacle, such as a power outlet. Accordingly, the term "electrically powered vehicle" as used herein may refer to any vehicle that includes an energy storage device to which electrical energy may be delivered, for example, via a power grid.

Further, the term "optical machine-readable code" generally refers to any type of code, symbol, character, sign, etc. that is suitable to be read, scanned and/or understood through optical interrogation and/or inspection. Example optical machine-readable codes include quick response (QR) codes and barcodes.

Exemplary technical effects of the methods, systems, and apparatus described herein may include at least one of (a) scanning an optical machine-readable code associated with a charging station, (b) determining an identification number associated with the charging station based on the scanned optical machine-readable code, (c) transmitting the identification number to a charging network server, (d) retrieving information and/or content associated with the charging station from charging network server, and (e) displaying a user interface including at least one of a control for the charging station and content associated with the charging station. Another exemplary technical effect of the methods, systems, and apparatus described herein includes at least one of (a) identifying a charging station in response to at least one input to the input device, (b) initiating communication with the identified charging station, and (c) displaying at least one user interface including advertising content associated with the charging station.

FIG. 1 illustrates an exemplary computing device 10. In the exemplary embodiment, computing device 10 includes a memory device 12 and a processor 14 coupled to memory device 12. In some embodiments, executable instructions are stored in memory device 12 and executed by processor 14. Computing device 10 is configurable to perform one or more operations described herein by programming and/or configuring processor 14. For example, processor 14 may be programmed by encoding an operation as one or more executable instructions and providing the executable instructions in memory device 12.

Memory device 12 is one or more devices operable to enable information such as executable instructions and/or other data to be stored and/or retrieved. Memory device 12 may include one or more computer readable media, such as, without limitation, hard disk storage, optical drive/disk storage, removable disk storage, flash memory, non-volatile memory, ROM, EEPROM, random access memory (RAM), etc. Memory device 12 may be configured to store, without limitation, computer-executable instructions, identification numbers, QR codes, barcodes, account information, advertising content, and/or any other type of data. Memory device 12 may be incorporated in and/or separate from processor 14.

Processor 14 may include one or more processing units (e.g., in a multi-core configuration). The term processor, as used herein, refers to central processing units, microprocessors, microcontrollers, reduced instruction set circuits (RISC), application specific integrated circuits (ASIC), logic circuits, and any other circuit or processor capable of executing instructions to perform functions described herein.

Computing device 10 includes a communication interface 16 coupled to processor 14. Communication interface 16 is configured to be coupled in communication with one or more other devices, such as another computing device 10, a network, etc. Communication interface 16 may include, without limitation, a serial communication adapter, a wired network adapter, a wireless network adapter, a mobile telecommunications adapter, a radio frequency (RF) receiver, a radio frequency identification (RFID) reader, a Bluetooth adapter, a Wi-Fi adapter, a ZigBee adapter, a near field communication (NFC) adapter, and/or any other device capable of communicating with one or more other devices, etc. Communication interface 16 may transmit information to and/or receive information from one or more different devices. In one example, a communication interface 16 of one computing device 10 transmits an identification number based on a machine-readable code to another computing device 10.

Further, computing device 10 includes an interface 18 to interact with a user 20, such as an operator of a vehicle. Interface 18 may be configured to display information to a user 20. In the exemplary embodiment, interface 18 includes a display device 22, such as a cathode ray tube (CRT), a liquid crystal display (LCD), a light-emitting diode (LED) display, an organic LED (OLED) display, an "electronic ink" display, and/or other device suitable to display information. Additionally, or alternatively, interface 18 may include an audio output device (e.g., an audio adapter and/or a speaker, etc.). Interface 18 further includes an input device 24 and an input device 25, each configured to receive one or more inputs. Input devices 24 and 25 may include, without limitation, buttons, knobs, keypads, pointing devices, a barcodes scanners, mice, cameras, touch sensitive panel (e.g., a touch pad or a touchscreen), gyroscopes, position detectors, and/or audio inputs (e.g., a microphone). It should be appreciated that computing device 10 may include any number of input devices, generally referred to herein as a first input device, a second input device, a third input device, and so on. As shown, input device 25 is provided to receive an input from user 20, while input device 24 is provided to receive an input from, for example, a machine-readable code 112, described below. In various embodiments, interface 18 is a single component, such as a touchscreen display 26, incorporating both display device 22 and input device 25. In such embodiments, a control or button to solicit a user input may be displayed on the touchscreen display 26, such than the control or button is associated with the input device 25 included in touchscreen display 26.

Figure 2:
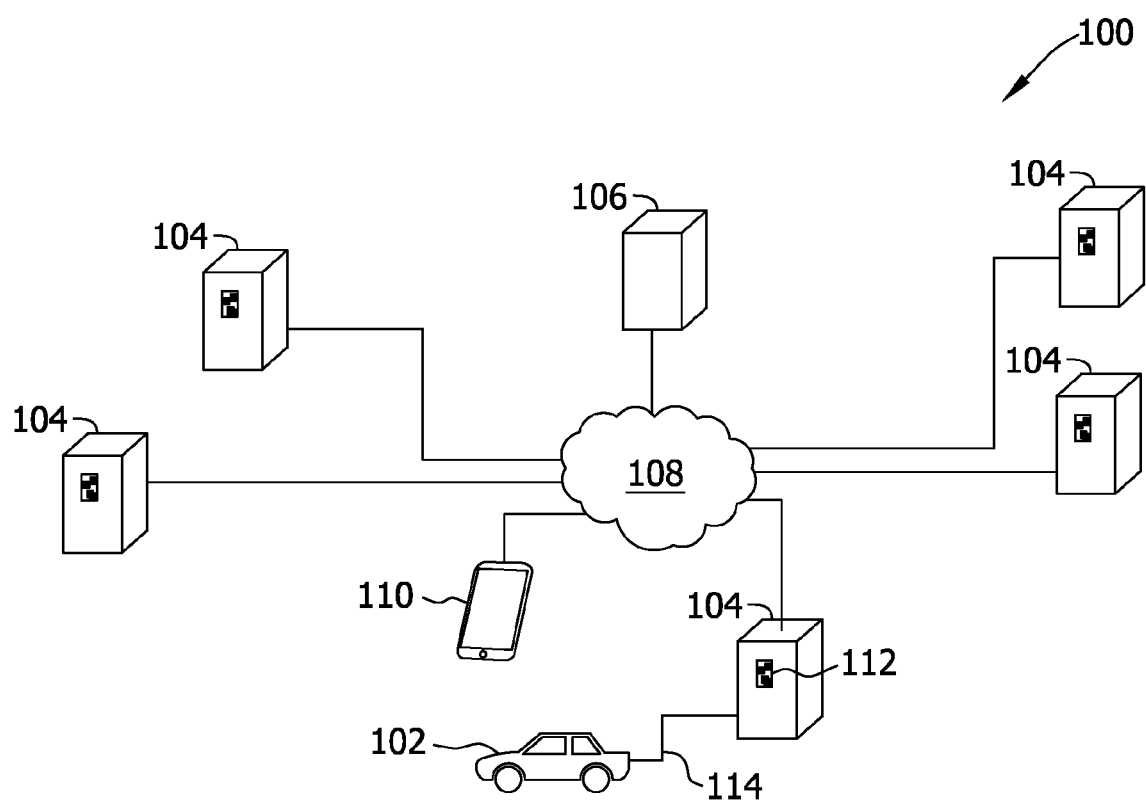
FIG. 2 is a block diagram of an exemplary charging system including a portable communication device.

FIG. 2 illustrates an exemplary charging system 100 that may be used to charge an electrically powered vehicle 102. In the exemplary embodiment, system 100 includes a charging station 104 coupled to vehicle 102 to charge an energy storage device included within vehicle 102. Charging station 104 is coupled to vehicle 102 through conduit 114 configured to transfer power from charging station 104 to vehicle 102. In another embodiment, charging station 104 is wirelessly coupled to vehicle 102 to provide inductive charging of vehicle 102 from charging station 104. In such an embodiment, conduit 114 may be omitted.

Further, charging station 104 is coupled in communication with a charging network server 106, through a network 108. Network 108 may include, without limitation, the Internet, a local area network (LAN), a wide area network (WAN), a wireless LAN (WLAN), a mesh network, a virtual private network (VPN), a cellular network, and/or any other network that enables system 100 to function as described herein. Charging system 100 further includes a portable communication device 110. In the exemplary embodiment, portable communication device 110 is an ultra-portable device, such as a smartphone, a cellular phone, a personal digital assistant (PDA), a tablet, etc. One or more of charging stations 104, charging network server 106, and/or portable communication device 110 are examples of computing device 10. It should be appreciated that charging stations 104, charging network server 106, and/or portable communication device 110 may include more or less components than illustrated in exemplary computing device 10.

In the exemplary embodiment, portable communication device 110 is coupled to charging network server 106 through network 108. In this manner, portable communication device 110 is permitted to communicate with charging station 104, through charging network server 106 and network 108. In such an embodiment, network 108 is a wide area network coupled to multiple charging stations 104 to permit centralized control and/or management of charging stations 104. In this manner, portable communication device 110 is able to communicate with any number of charging stations 104 coupled to charging network server 106. Additionally, or alternatively, network 108 includes a private local network between portable communication device 110 and charging station 104, supported by, for example, Wi-Fi, Bluetooth, ZigBee, or NFC communication. In such an embodiment, portable communication device 110 is configured to communicate directly with charging station 104, rather than through charging network server 106. It should be appreciated that different configurations of networks may be utilized to support direct and/or indirect communication between charging station 104, charging network server 106, and/or portable communication device 110 in other embodiments.

As shown in FIG. 2, multiple charging stations 104 are provided to charge vehicle 102 at various different locations. By geographically distributing charging stations 104, user 20 is permitted to charge vehicle 102 at a proximate location when a need or a desire to charge vehicle 102 exists. Each of charging stations 104 includes an optical machine-readable code 112, which is unique to the particular charging station 104. Optical machine-readable code 112 is usable by portable communication device 110 to identify the particular charging station proximate to vehicle 102. Each optical machine-readable code 112 is affixed directly to charging station 104 (as shown) or presented proximate to charging station 104 on another surface, such as a support structure, etc. In one example, optical machine-readable code 112 includes a QR code. In other embodiments, optical machine-readable code 112 includes a barcode. In still other embodiments, machine-readable code 112 includes a different type of identifier that is unique to charging station 104 and suitable to be scanned, read, and/or understood by portable communication device 110.

Additionally, or alternatively, a radio frequency identification (RFID) code may be associated with charging station 104. In such an example, portable communication device 110 includes an RFID reader 24 to interpret the RFID code and identify charging station from the RFID code. In at least one embodiment, user 20 enters an identification number for charging station 104 to input device 25 of portable communication device 110. Accordingly, while optical machine-readable code 112 is described in the exemplary methods below, it should be appreciated that various types of wired, wireless, and/or manual methods are available to permit user 20 and/or portable communication device 110 to identify charging station 104.

Figure 3:
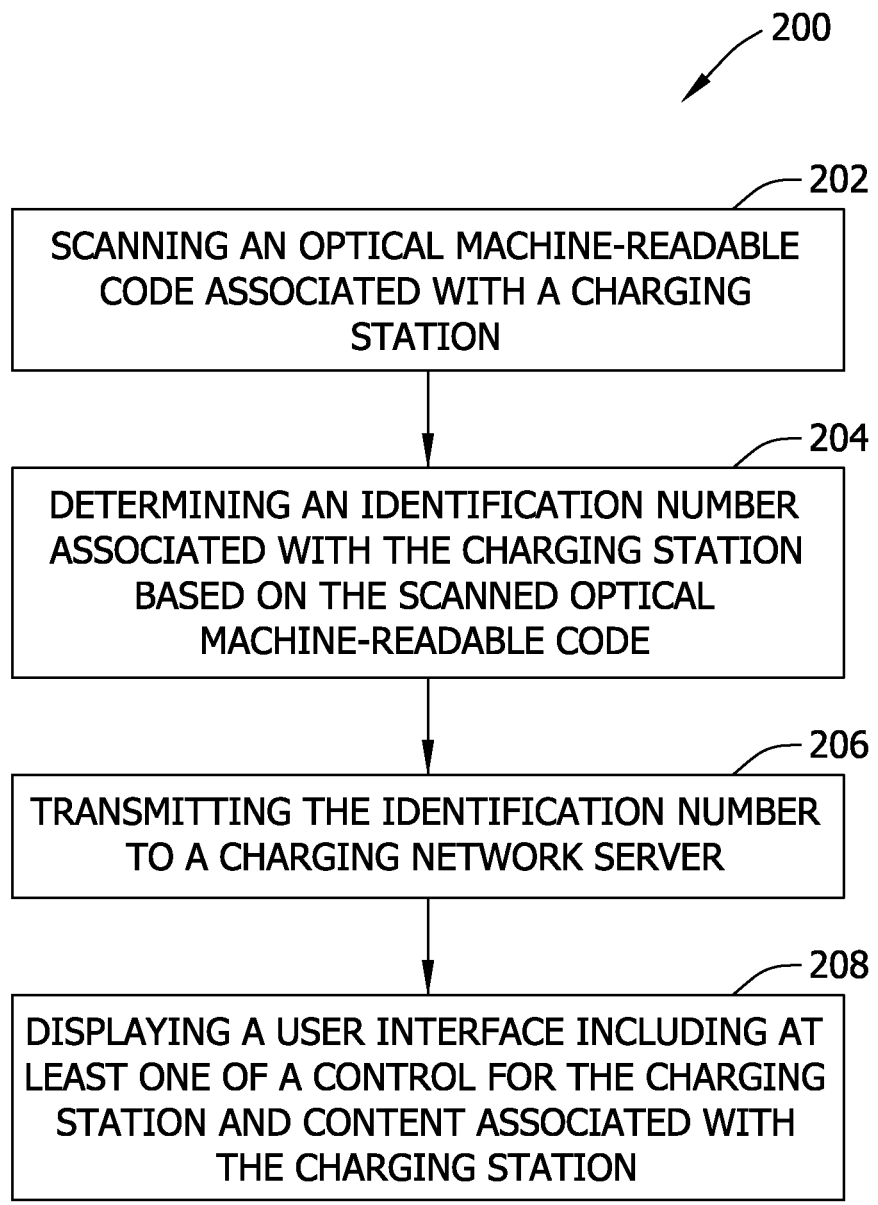
FIG. 3 is a flowchart of an exemplary method for use in communicating with a charging station.

FIG. 3 illustrates an exemplary method 200 for use in charging vehicle 102 from charging station 104. While method 200 is described with reference to charging system 100, it should be appreciated that method 200 is not limited to charging system 100 and may be used with other charging system embodiments. Likewise, charging system 100 should not be understood to be limited to exemplary method 200.

Figure 4:
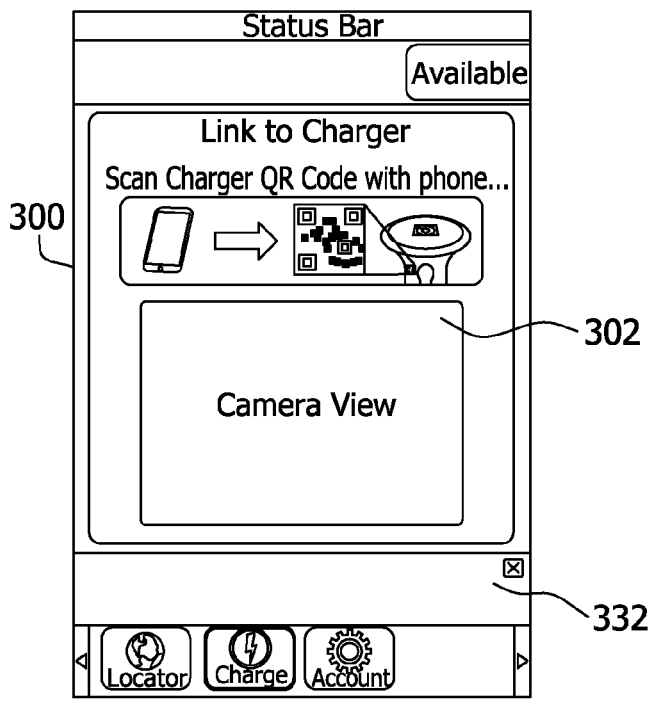
FIG. 4 is an exemplary charging interface, which may be displayed by the portable communication device of FIG. 2.

In the exemplary embodiment, portable communication device 110 scans 202 optical machine-readable code 112 associated with charging station 104. Portable communication device 110 scans optical machine-readable code 112 through use of input device 24. In one example, input device 24 includes a camera. In another example, input device 24 includes a barcode scanner. FIG. 4 illustrates an exemplary charging interface 300, for use in scanning machine-readable code 112. Charging interface 300 is displayed, at display device 22, and includes a view finder window 302. In use, user 20 positions portable communication device 110 to include optical machine-readable code 112 within view finder window 302 and provides an input to another input device 25. In response, portable communication device 110 captures an image of optical machine-readable code 112.

When the image is captured by portable communication device 110, processor 14 determines 204 an identification number associated with charging station 104 based on the scanned optical machine-readable code. Generally, the identification number includes an alpha, numeric, and/or alphanumeric code, unique to charging station 104 (e.g., a serial number) and/or suitable to distinguish charging station 104 from one or more other charging stations 104. After determining the identification number, processor 14 transmits 206 the identification number to charging network server 106 through network 108. Portable communication device 110 often transmits additional information with the identification number to charging network server 106, such as, without limitation, user account information, location information, user information, etc.

In response to the identification number, charging network server 106 accesses a database stored in memory device 12 of charging network server 106 to retrieve information related to the identification number. Charging network server 106 then provides the retrieved information to portable communication device 110. Charging network server 106 further communicates with charging station 104 to host communication between portable communication device 110 and charging station 104. Additionally, charging network server 106 associates a user account with communication and/or power transfer between portable communication device 110 and charging station 104. In one example, the associated user account enables billing for power transferred to vehicle 102. Charging network server 106 associates the user account based on, for example, information provided from portable communication device 110 with the identification number.

In the exemplary embodiment, information provided from charging network server 106 to portable communication device 110 includes, without limitation, biographical information of charging station 104, status of charging station 104, advertising content, point of interest information, and/or other information associated with charge station 104, or designated by an operator of charging station 104 and/or charging system 100. In response to such information, portable communication device 110 displays 208 at display device 22 one or more user interfaces including, for example, a control for charging station 104 and/or content associated with charging station 104.

Figure 5:
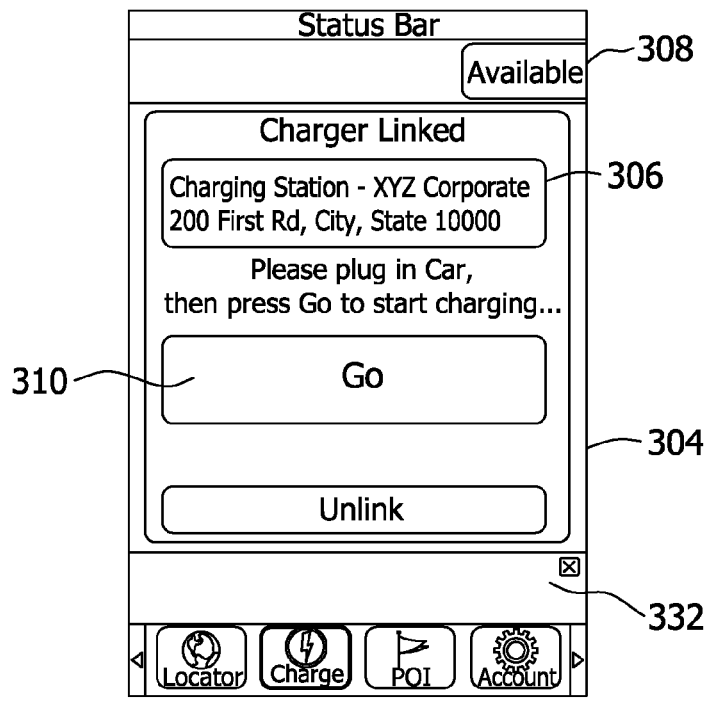
FIG. 5 is an exemplary charging interface, which may be displayed to indicate a status of a charging station.

FIG. 5 illustrates an exemplary charging interface 304, for use in presenting charging information to user 20. In the exemplary embodiment, charging interface 304 includes an information section 306, which includes biographical information, such as, for example, a charging station number, an operator of charging station 104, and an address of charging station 104. As should be apparent, more or less biographical information about charging station 104 may be included in other charging interface embodiments. Charging interface 304 further includes a status section 308 to indicate the status of charging station 104. A status may include available (as shown), charging information (as shown below), or other indications of the state of charging station 104, such as, for example, in service by another user 20, an approaching reservation by another user 20 (e.g., a next reserved interval in time), and out-of-order, (e.g., not in service).

As shown in FIG. 5, charging interface 304 includes a "GO" button 310 to initiate power transfer from charging station 104 to vehicle 102. When user 20 provides an input to button 310, portable communication device 110 receives an initiate charge command, at input device 25, from user 20 to initiate power transfer from charging station 104 to vehicle 102. Portable communication device 110, in turn, communicates the initiate charge command to charging station 104, through charging network server 106 and/or network 108. In response, charging station 104 initiates power transfer from charging station 104 to vehicle 102. In at least one embodiment, power transfer is initiated automatically when portable communication device 110 establishes communication with charging station 104 (if conduit 114 is coupled between charging station 104 and vehicle 102), such that a charge command from user 20 may not be required.

Figure 6:
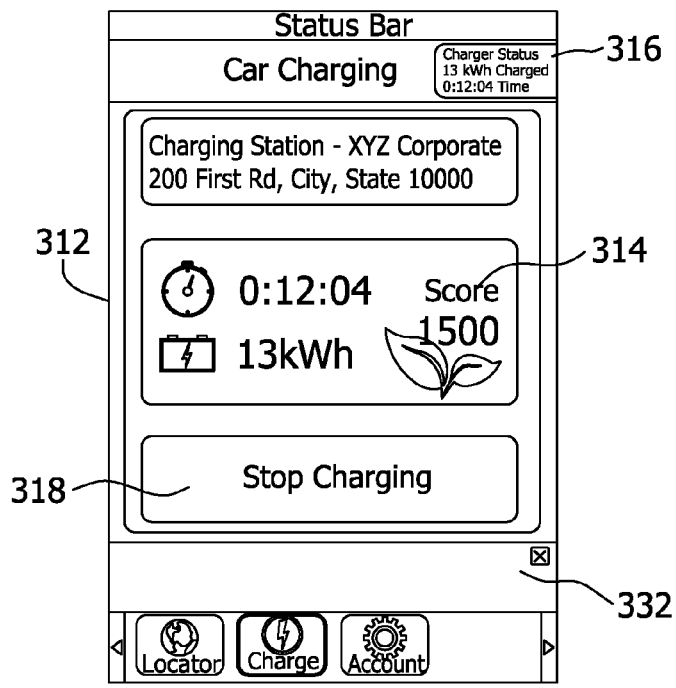
FIG. 6 is an exemplary charging interface, which may be displayed when a vehicle is charging from a charging station.

FIG. 6 illustrates an exemplary charging interface 312, for use in presenting power transfer status information to user 20. As shown, charging interface 312 includes a charge status panel 314 used to display the total power transferred and the total time elapsed, as well as a green score to indicate a measure of the impact on environment by use of vehicle 102. Charging interface 312 further includes a charge status banner 316, which remains viewable when user 20 utilizes portable communication device 110 for one or more other functions related or unrelated to charging vehicle 102. For example, charge status banner 316 is included in a parking reservation interface 330 (FIG. 10) described below. In this manner, user 20 is permitted to view a status of power transfer from charging station 104 to vehicle 102 without limiting use of portable communication device 110. In the exemplary embodiment, charging interface 312 includes a "Stop Charging" button 318, which is provided to receive an input, at input device 25, from user 20 to halt power transfer from charging station 104 to vehicle 102. Upon receiving a stop charge command through button 318, portable communication device 110 communicates the stop charge command to charging station 104, through charging network server 106 and/or network 108. Charging of vehicle 102 may be halted under other circumstances, such as disconnecting conduit 114, a fault at charging station 104, or other condition. Under such conditions, charging station 104 and/or charging network server 106 is configured to provide content, which is displayed at portable communication device 110, indicating the condition resulting in halt of power transfer to vehicle 102.

Figure 7:
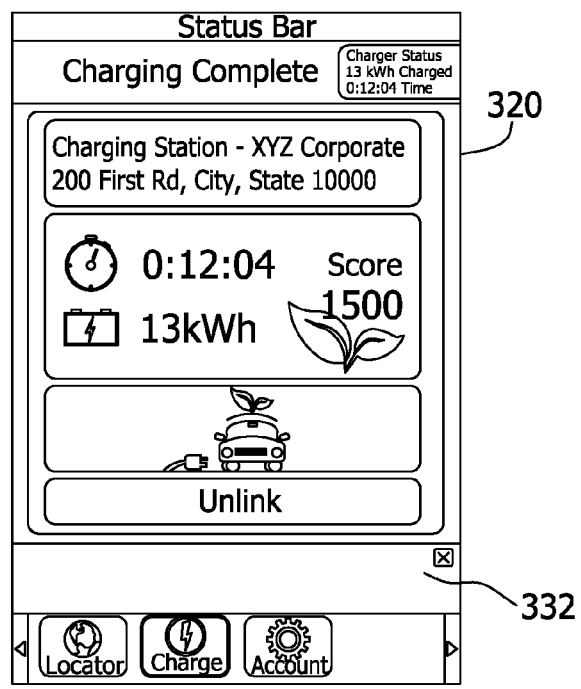
FIG. 7 is an exemplary charge complete interface, which may be displayed after a vehicle has completed charging from a charging station.

If power transfer continues without a stop charge command from user 20, power transfer from charging station 104 to vehicle 102 is interrupted upon complete charging of vehicle 102. Power transfer may be considered complete based on one or more parameters indicated by user 20, a charge capacity of vehicle 102, and/or an interval reserved at charging station 104. FIG. 7 illustrates a charging complete interface 320, for use in indicating to user 20 that power transfer to vehicle 102 is complete. In the exemplary embodiment, charging complete interface 320 includes the total power transferred, the total time elapsed, and the green score. When charge complete interface 320 is displayed at display device 22 of portable communication device 110, user 20 is permitted to decouple vehicle 102 from charging station 104 and further utilize vehicle 102.

Through use of the methods and/or interfaces described herein, portable communication device 110 is configured to provide control of charging station 104, such that controls and/or displays integrated into charging station 104 may be unnecessary. Accordingly, "headless" charging station 104 may be employed in charging system 100, in combination with the systems and methods described herein, to provide improved reliability and reduced cost.

It should be appreciated that interfaces 300, 304, 312, and 320 are merely exemplary interfaces describing the systems and methods presented herein. The exemplary interfaces are not intended to limit the scope of the systems or methods presented herein. Various different formats and/or types of information may be included in other interface embodiments, while remaining consistent with the present disclosure. Furthermore, other user services may be provided through interfaces displayed at portable communication device 110. For example, charging reservation, parking reservation, payment information, point of interest information, advertising content and/or other service may be included in one or more interfaces displayed at portable communication device 110. A number of services and associated interfaces are described below for purposes of illustration. It should be appreciated that one or more other services related or unrelated to charging vehicle 102 may be integrated with the systems and methods described herein.

Figure 8:
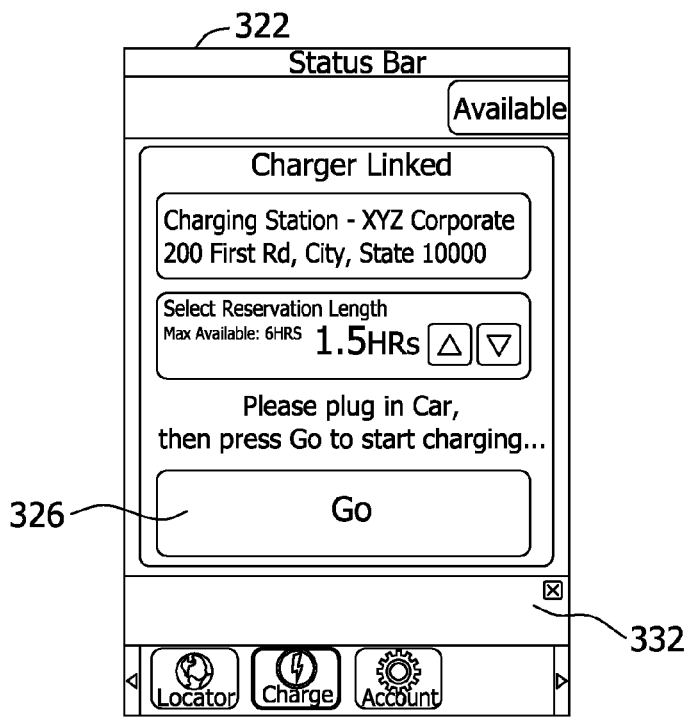
FIG. 8 is an exemplary charging interface, which may be displayed to request a reservation prior to charging a vehicle.

According to one or more embodiments, reservations may be utilized to control access to charging station 104. In this exemplary embodiment, interfaces 322 and 324 are provided to create and/or edit a reservation for charging station 104. Specifically, FIG. 8 illustrates interface 322, for use in reserving charging station 104 before initiating a charge of vehicle 102. As shown, charging interface 322 prompts user 20 to input a charging interval, prior to permitting an initiate charge command to button 326. Specifically, portable communication device 110 accesses a reservation schedule for charging station 104, through charging network server 106. In the exemplary embodiment, user 20 is prompted to enter a reservation, which does not overlap a reservation of another user 20, prior to charging vehicle 102. In this manner, access to charging station 104 is controlled by reservations. More generally, charging of vehicle 102 is often more time consuming than providing gasoline to an internal combustion engine vehicle. Accordingly, access to charging station 104 based on reservations may be utilized in some embodiments, to encourage consistent use of charging station 104, while reducing idle time.

Figure 9:
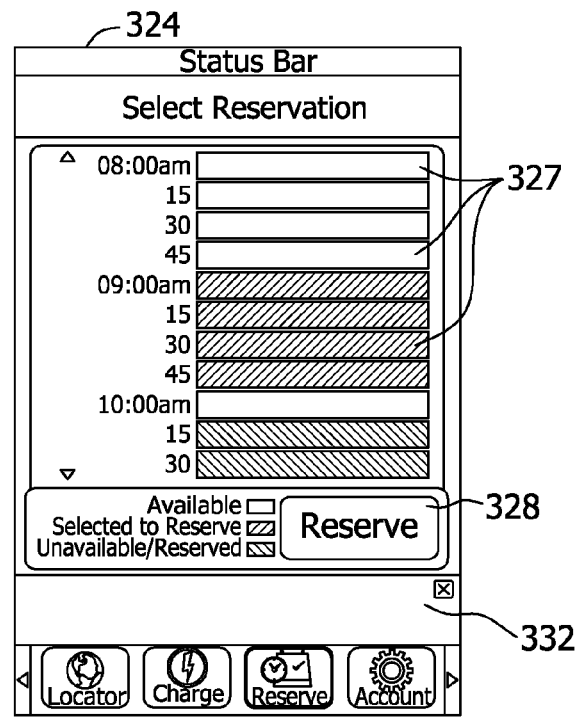
FIG. 9 is an exemplary reservation interface, which may be displayed by the portable communication device of FIG. 2.

Moreover, FIG. 9 illustrates an exemplary reservation interface 324, for use in reserving charging station 104 in advance of charging vehicle 102. Reservation interface 324 is directed to one charging station 104. Reservation interface 324 permits portable communication device 110 to display the reservation scheduled and receive input to view, add, edit, and/or cancel reservations for charging station 104. Specifically, in the exemplary embodiment, time intervals 327 within the reservation schedule are selectable by one or more inputs to input device 25. After selecting one or more time intervals, user 20 is able to reserve the interval(s) by providing an input to a "Reserve" button 328. Upon reserving charging station 104, user 20 is granted access to charging station 104 (to the exclusion of others) during the reserved time intervals. Further, a charging station menu (not shown) is selected from reservation interface 324 to toggle between different charging stations 104. In response to selection of a different charging station, portable communication device 110 retrieves a reservation schedule for the different charging station 104 from charging network server 106 to permit user 20 to view, add, edit, and/or cancel reservations for the newly selected charging station 104.

Figure 10:
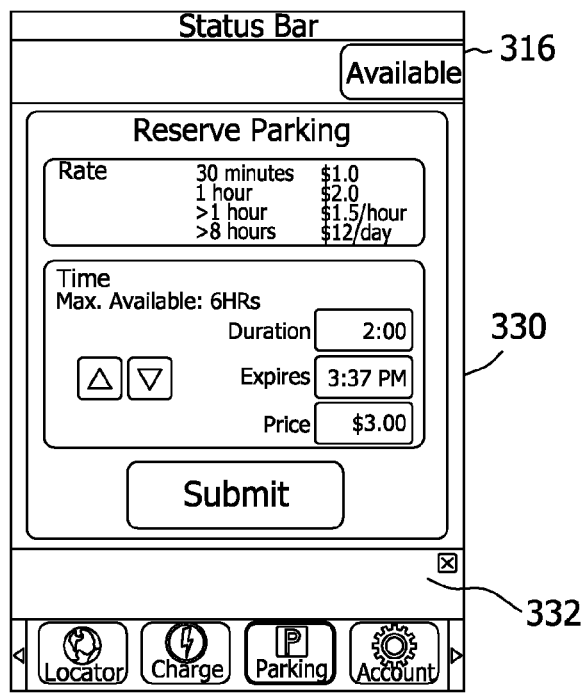
FIG. 10 is an exemplary parking reservation interface, which may be displayed by the portable communication device of FIG. 2.

It should be appreciated that one or more similar interfaces may be provided to complete/edit other types of reservations in various embodiments. In one example, FIG. 10 illustrates an exemplary parking reservation interface 330, for use in reserving parking. Parking reservation interface 330 performs substantially consistent with the above reservation interfaces, to interact with a reservation schedule for a parking location. The reservation schedule may be retrieved from charging network server 106 and/or another computing device coupled to network 108. In various embodiments, a charging reservation or a parking reservation are linked to a user account associated with user 20. In at least one embodiment, a user account may be required to make a reservation to charge vehicle 102 and/or to park vehicle 102.

In addition to reservation and other contemplated services, the exemplary interfaces provided herein are used to display various types of content to user 20. The content may include, for example, advertising content, news content, weather content, instruction content regarding vehicle 102 and/or charging station 104, information content, and map content related to a current location of user 20 or charging station 104. Parking reservation interface 330, for example, includes a content panel 332. Several other interfaces also include content panel 332. The type of content included in content panel 332 may depend on charging station 104, or an operator of charging station 104, and/or charging system 100, etc. In one example, advertising content is included at content panel 332 to advertise products offered through a convenience store associated with charging station 104. In other examples, an operator of charging station 104 includes advertising content at content panel 332 directed to products offered for sale by the operator of charging station 104 and/or others through agreement with the operator. In such an example, an owner/operator of a car wash in close proximity to charging station 104 may contract with the operator of charging station 104 to advertise the car wash to user 20 at portable communication device 110. It should be appreciated that advertising content may be provided for and/or paid for through a number of different sources for inclusion in one or more interfaces consistent with the present disclosure.

Figure 11:
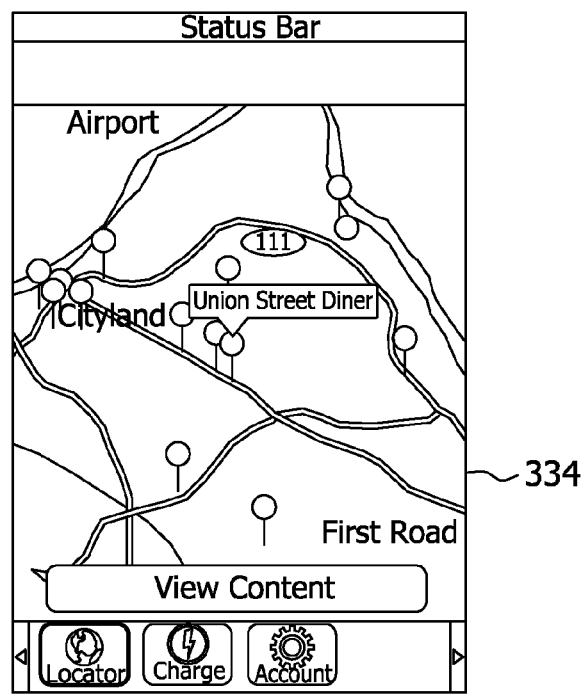
FIG. 11 is an exemplary location interface, which may be displayed by the portable communication device of FIG. 2.

FIG. 11 illustrates an exemplary location interface 334, for use in displaying information about points of interest. As shown, location interface 334 indicates a current location of user 20 and/or charging station 104 included in map information associated with the current location. The map information and other content included in the example interfaces herein may be embedded content retrieved from one or more servers accessible through network 108. For example, content from one or more webpages (e.g., map information, parking reservation schedules, etc.) may be embedded into an interface displayed at portable communication device 110. Additionally, multiple points of interest (POI) associated with charging station 104 are included in location interface 334. As used herein, a "point of interest" generally refers to a location that user 20 or other person might find interesting. For example, points of interest may include, without limitation, restaurants, mechanics, carwashes, movie theatres, and shopping malls. In the exemplary embodiment, the points of interest are indicated by charging network server 106. Similar to advertising content, points of interest may be included based on charging station 104, or an operator of charging station 104 and/or charging system 100, etc. Further, in at least one embodiment, points of interest are included or excluded based on user preferences provided to portable communication device 110.

Figure 12:
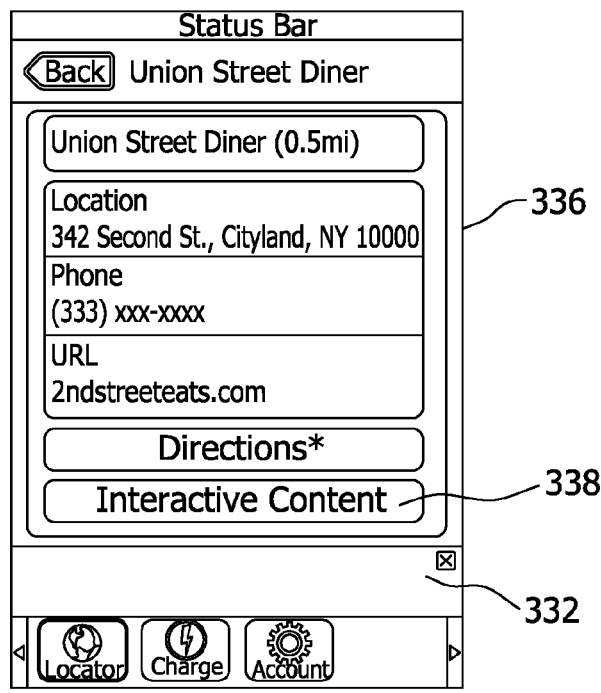
FIG. 12 is an exemplary point of interest interface, which may be displayed in response to a request for more detail to the location interface of FIG. 11.

From location interface 334, user 20 is permitted to view points of interest and to provide an input to input device 25 to select one or more points of interest. Upon selection of the point of interest, one or more other interfaces may be displayed to user 20. FIG. 12, for example, illustrates a point of interest interface 336, for use in displaying information about a selected point of interest. Point of interest interface 336 provides biographic information for the selected point of interest and an interactive content button 338. Interactive content button 338 is configured to launch content (e.g., web pages, web-based content, etc.) related to selected point of interest. In one example, for a restaurant point of interest, an input to interactive content button 338 launches a home page and/or menu page associated with the restaurant. Further, location interface 334 permits user 20 to search points of interest, according to, for example, name, category, location, service, and/or type. Search results are present in a list or by location within the map information shown in FIG. 11. Multiple inputs may be provided from user 20 to input device 25 to further filter and/or select within search results.

Figure 13:
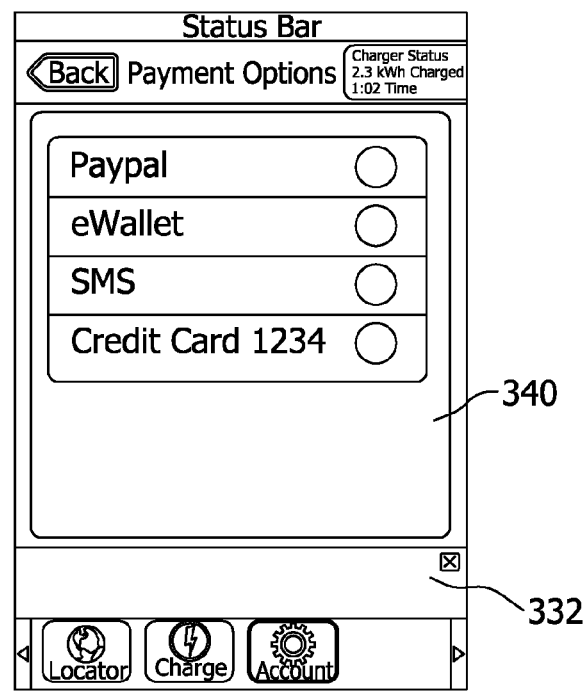
FIG. 13 is an exemplary settings interface, which may be displayed by the portable communication device of FIG. 2.

In addition to the charging interfaces and service interfaces presented to user 20, one or more settings interfaces may be displayed to user 20 at display device 22. One or more settings interfaces may be used to provide user login information, user account information, payment information, user preferences, etc. Through such interfaces, portable communication device 110 is distinguished from other portable communication devices 110 and associated with user 20. FIG. 13 illustrates one exemplary setting interface 340, for use in editing and/or selecting a type of payment associated with a user account. As shown, multiple different types of payment are included and/or selectable by user 20. In this manner, user 20 is able to assign charges for power transfer to different types of payment. Various different types of settings may be provided to the user 20 in other settings interfaces to improve the efficiency of charging vehicle 102 and/or accessing information associated with charging station 104 and/or desired by user 20.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other systems and methods.

While certain functions and/or operations are described above with respect to particular devices, it is contemplated that any device may perform one or more of the described operations. Systems and methods described herein may leverage existing available portable communication devices to provide control of one or more charging station. Such use of portable communication devices permits a user to utilize a familiar device, while reducing and/or eliminating the need for separate control integrated into the charging station. Systems and methods herein may further provide content associated with the charging stations, such as location, advertising, points of interest, status information, etc., to permit a user and/or operator to utilize time spent charging an electrically powered vehicle.

One or more aspects of the present disclosure transform a general-purpose computing device into a special-purpose computing device when configured to execute the instructions described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A portable communication device for use in charging an electrically powered vehicle from a charging station, said portable communication device comprising:
   a first input device configured to scan an optical machine-readable code associated with the charging station;
   a display device; and
   a processor coupled to said first input and said display devices and configured to determine an identification number of the charging station based on the optical machine-readable code scanned by said first input device, transmit the identification number to a charging network server to initiate communication with the charging station, wherein the charging network server receives the identification number and hosts communication between the portable communication device and the charging station based on the identification number, said processor further configured to receive content associated with the charging station from the charging network server, and to cause said display device to display a user interface, the user interface including the content associated with the charging station.

2. The portable communication device of claim 1, further comprising a second input device coupled to said processor, said second input device configured to receive a charge command from a user, said processor further configured to receive a charge command from said second input device and to transmit the charge command to the charging network server, wherein the charging network server transmits the charge command to the charging station.

3. The portable communication device of claim 2, wherein the user interface comprises at least one control to receive the charge command, the at least one control associated with said second input device.

4. The portable communication device of claim 1, wherein the optical machine-readable code comprises at least one of a barcode and a quick response (QR) code.

5. The portable communication device of claim 1, wherein said first input device comprises a camera configured to capture an image of the optical machine-readable code.

6. The portable communication device of claim 1, wherein said processor is further configured to receive the content associated with the charging station from the charging network server based on the identification number.

7. The portable communication device of claim 6, wherein the content comprises at least one of advertising content, news content, and weather content.

8. The portable communication device of claim 1, wherein the user interface comprises biographical information about the charging station and status information for the charging station.

9. The portable communication device of claim 1, wherein said processor is further configured to cause said display device to display at least one of a reservation interface configured to receive a reservation for a charging station and a location interface configured to identify points of interest associated with a charging station.

10. A method for use in communicating with a charging station through a portable communication device, the portable communication device including a first input device and a display device, said method comprising:
   scanning, at the first input device, an optical machine-readable code associated with a charging station;
   determining an identification number associated with the charging station based on the scanned optical machine-readable code;
   transmitting the identification number to a charging network server, wherein the charging network server hosts communication between the portable communication device and the charging station based on the identification number;
   receiving content associated with the charging station from the charging network server; and
   displaying, at the display device, a user interface including at least one of a control for the charging station and the content associated with the charging station.

11. The method of claim 10, further comprising receiving a charge command, at a second input device, and transmitting the charge command to the charging network server, the second input device associated with the control for the charging station.

12. The method of claim 10, further comprising displaying, at the display device, content associated to the charging station in response to at least one input to a second input device of the portable communication device.

13. The method of claim 12, wherein the content is defined by an operator of at least one of the charging station and the charging network server.

14. One or more non-transitory computer-readable storage media having computer-executable instructions embodiments thereon, wherein when executed by at least one processor, the computer-executable instructions cause the processor to:
   determine an identification number associated with a charging station based on a scanned optical machine-readable code;
   transmit the identification number to a charging network server, wherein the charging network server hosts communication between the processor and the charging station;
   retrieve content associated with the charging station from the charging network server based on the determined identification number; and
   cause a user interface associated with the charging station to be displayed, the user interface including at least one of a control for the charging station and the content associated with the charging station.

15. The one or more non-transitory computer-readable storage media of claim 14, wherein when executed by the at least one processor, the computer-executable instructions further cause the processor to transmit a charge command to the charging network server in response to an input to the control for the charging station.

16. The one or more non-transitory computer-readable storage media of claim 14, wherein content associated with the charging station comprises at least one of advertising content associated with the charging station and status information for the charging station.

17. The one or more non-transitory computer-readable storage media of claim 14, wherein when executed by the at least one processor, the computer-executable instructions further cause the processor to cause a camera coupled to the processor to capture an image of the optical machine readable code.

18. The one or more non-transitory computer-readable storage media of claim 14, wherein when executed by the at least one processor, the computer-executable instructions further cause the processor to cause a reservation interface to be displayed to receive at least one reservation for a charging station coupled to the charging network server.

19. The one or more non-transitory computer-readable storage media of claim 14, wherein the optical machine-readable code includes at least one of a barcode and a quick response (QR) code.

20. A portable communication device for use in charging an electrically powered vehicle, said portable communication device comprising:
- an input device configured to receive at least one input identifying a charging station;
- a display device; and
- a processor coupled to said input and display devices and configured to identify a charging station in response to the at least one input to said input device, to transmit information associated with the identified charging station to a charging network server, wherein the charging network server hosts communication between the portable communication device and the identified charging station based on the transmitted information, to receive advertising content associated with the charging station from the charging network server, and to display, at said display device, a user interface including the advertising content associated with the charging station.

* * * * *